US011754177B2

(12) United States Patent
Park et al.

(10) Patent No.: US 11,754,177 B2
(45) Date of Patent: Sep. 12, 2023

(54) ELECTRONIC SHIFT CONTROL APPARATUS

(71) Applicants: Hyundai Motor Company, Seoul (KR); Kia Corporation, Seoul (KR)

(72) Inventors: Han Gil Park, Suwon-Si (KR); Min Gwon Lee, Gyeongsan-Si (KR)

(73) Assignees: HYUNDAI MOTOR COMPANY, Seoul (KR); KIA CORPORATION, Seoul (KR)

( * ) Notice: Subject to any disclaimer, the term of this patent is extended or adjusted under 35 U.S.C. 154(b) by 0 days.

(21) Appl. No.: 17/530,110

(22) Filed: Nov. 18, 2021

(65) Prior Publication Data

US 2022/0349468 A1 Nov. 3, 2022

(30) Foreign Application Priority Data

May 3, 2021 (KR) .................. 10-2021-0057097

(51) Int. Cl.
*F16H 61/24* (2006.01)
*F16H 59/12* (2006.01)
*F16H 61/02* (2006.01)
*F16H 61/00* (2006.01)
*F16H 59/08* (2006.01)

(52) U.S. Cl.
CPC ............ *F16H 61/24* (2013.01); *F16H 59/12* (2013.01); *F16H 61/0006* (2013.01); *F16H 61/0213* (2013.01); *F16H 2059/081* (2013.01); *F16H 2061/241* (2013.01)

(58) Field of Classification Search
CPC .... F16H 61/24; F16H 2061/241; F16H 59/12; F16H 61/0006; A63F 13/285; G05G 1/10; G05G 5/03
See application file for complete search history.

(56) References Cited

U.S. PATENT DOCUMENTS

| 6,717,299 | B2* | 4/2004 | Bacile | H02K 5/24 310/89 |
| 6,874,382 | B2* | 4/2005 | Danielsson | F16H 59/044 74/335 |
| 8,371,188 | B2* | 2/2013 | Bortolon | F16H 61/22 74/473.21 |
| 8,607,657 | B2* | 12/2013 | Haevescher | F16H 59/02 74/473.12 |
| 10,288,172 | B2* | 5/2019 | Kim | F16H 61/08 |
| 10,528,137 | B2* | 1/2020 | Vanhelle | G05G 5/03 |
| 10,801,610 | B2* | 10/2020 | Cha | F16H 59/08 |
| 10,969,008 | B2* | 4/2021 | Beattie | F16H 59/08 |
| 2020/0284339 | A1* | 9/2020 | Kim | F16H 61/24 |
| 2020/0371635 | A1* | 11/2020 | Burgess | G06F 3/0416 |
| 2021/0054924 | A1* | 2/2021 | Kim | F16H 59/08 |
| 2022/0271218 | A1* | 8/2022 | Wang | H01L 43/10 |

FOREIGN PATENT DOCUMENTS

KR 20170080305 A * 7/2017
KR 10-2019-0134927 12/2019

* cited by examiner

*Primary Examiner* — Gregory Robert Weber
(74) *Attorney, Agent, or Firm* — MORGAN, LEWIS & BOCKIUS LLP

(57) ABSTRACT

An electronic shift control apparatus may include a shift dial that a user operates to select an R-range, an N-range (Nd-range and Nr-range), and a D-range, a P-range button which is operated to select a P-range, and a haptic motor that generates a haptic signal. When a driver shifts into a specific shifting range (R-range) of a vehicle by operating the shift dial, a haptic signal may be transmitted to the driver.

11 Claims, 8 Drawing Sheets

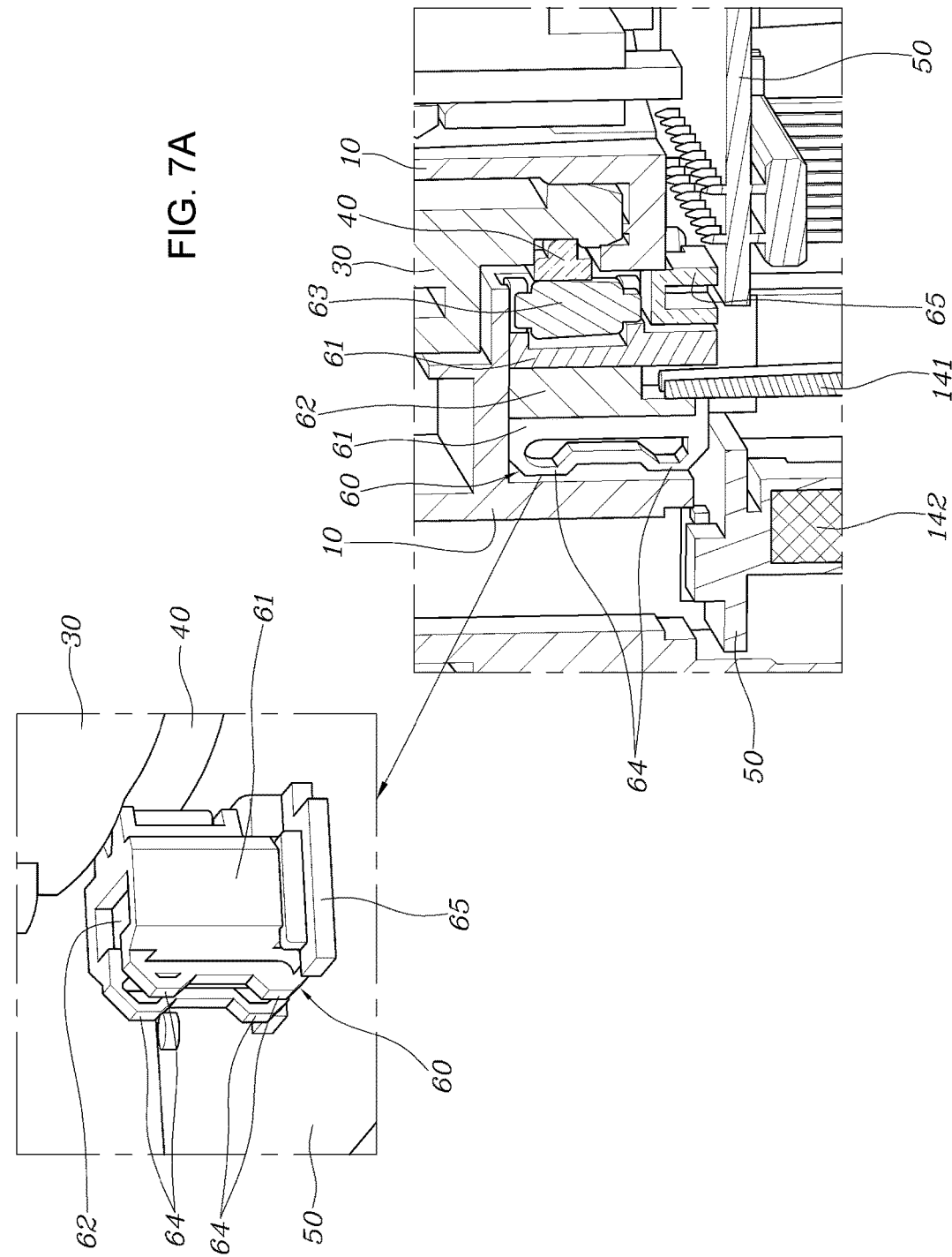

ELECTRONIC SHIFT CONTROL APPARATUS

CROSS-REFERENCE TO RELATED APPLICATION

The present application claims priority to Korean Patent Application No. 10-2021-0057097, filed May 3, 2021, the entire contents of which is incorporated herein for all purposes by this reference.

BACKGROUND OF THE INVENTION

Field of the Invention

The present invention relates to an electronic shift control apparatus, and more particularly, to an electronic shift control apparatus that can prevent mis-operation when a driver shifts gears and can minimize vibration transmitted from a haptic motor to a main housing by transmitting a haptic signal (tactual sense signal) to the driver when the driver shifts into a specific shifting range by rotating a shift dial.

Description of Related Art

In general, in vehicles provided with an automatic transmission, gears of desired shifting stages are automatically operated by controlling hydraulic pressure within a shifting range set for the speed of the vehicles.

An automatic transmission generates gear ratios using a hydraulic circuit, a planetary gear set, and friction members to shift and these components are controlled by a Transmission Control Unit (TCU).

A Shift-By-Wire (SBW) system, which is an electronic shift system for a vehicle, has no mechanical connection structure such as a cable between a transmission and a shift lever, unlike existing mechanical shift systems. In the SBW system, when a sensor value generated by operation of an electronic shift control apparatus (a shift lever or a shift button) is transmitted to the TCU, a solenoid or an electric motor is operated by an electronic signal from the TCU and hydraulic pressure is applied or not to the hydraulic circuit for each gear stage, electronically controlling shifting.

Accordingly, an automatic transmission based on an SBW system has an advantage that shifting into a D (driving)-state, an R (rear)-stage, and an N-stage (Nd-stage or Nr-stage) is easily achieved by transmitting the intention to shift of a driver to a Transmission Control Unit (TCU) using an electrical signal by simply operating an electronic shift control apparatus (a shift lever, button, or dial), and has another advantage that since the shift control apparatus can be formed in a small size, a wide area can be secured between the driver seat and the passenger seat.

As a method of shifting using an electronic shift system, largely, there is a lever type using a lever, a button type using a button, and a dial type using a dial.

The information disclosed in this Background of the Invention section is only for enhancement of understanding of the general background of the invention and may not be taken as an acknowledgement or any form of suggestion that this information forms the prior art already known to a person skilled in the art.

BRIEF SUMMARY

Various aspects of the present invention are directed to providing an electronic shift control apparatus having a shift dial which is operated by a driver to select an R-stage, an N-stage (Nd-stage or Nr-stage), and a D-stage and a P-stage button which is operated by a driver to select a P (parking)-stage, and an objective of the present invention is to improve safety by preventing mis-operation when a driver shifts gears by transmitting a haptic signal to the driver when the driver shifts into a specific shifting range by rotating the shift dial.

Various aspects of the present invention are to increase the intensity of a haptic signal which is transmitted to a shift dial so that a driver can more clearly recognize the haptic signal by minimizing vibration which is transmitted from a haptic motor to a main housing.

To achieve the objectives of the present invention, an electronic shift control apparatus includes: a shift dial rotatable with respect to a main housing for selecting one of shifting ranges of a vehicle when being rotated; a rotator coupled to the shift dial to rotate with the shift dial; a groove plate coupled to the rotator to rotate with the rotator; a Printed Circuit Board (PCB) fixed to the main housing and outputting a shifting range signal selected by the shift dial to a Transmission Control Unit (TCU) electrically connected to the PCB; and a haptic motor assembly fixed to the main housing, connected to the groove plate, controlled to operate by the PCB, and generating a haptic signal when operating.

The haptic signal generated by the haptic motor assembly may be transmitted to a driver's hand operating the shift dial through the groove plate, the rotator, and the shift dial.

The shifting range of the vehicle which is selected when the shift dial is operated may be any one of an R-range, an N-range, and a D-range.

The electronic shift control apparatus may further include: a sensing gear rotatably coupled to the main housing and engaged with the rotator; and a magnet combined with the sensing gear, in which the PCB may output a shifting range signal of any one of the R-range, the N-range, and the D-range according to a change of magnetic flux due to a position change of the magnet when the shift dial is rotated.

The electronic shift control apparatus may further include a P-range button disposed at a center portion of the shift dial to be movable upwards and downwards with respect to the shift dial in response to a driver's pressing thereon, in which the PCB may recognize a contact of the P-range button and generate a P-range signal when the P-range button is operated.

The haptic motor assembly may include: a motor housing fixed to the main housing; a haptic motor inserted and fixed in the motor housing, electrically connected to the PCB, and controlled to be operated by the PCB; and a roller rotatably coupled to the motor housing and being in contact with the groove plate.

The PCB may operate the haptic motor only when a shift signal selected when the shift dial is operated and an actual shift signal of a transmission which is fed back through the TCU coincide with each other.

The haptic motor may be controlled to operate and generate a haptic signal by the PCB when the shift dial is operated and the R-range is selected.

A haptic signal generated by the haptic motor may be transmitted to the shift dial through the motor housing, the roller, the groove plate, and the rotator, and the haptic signal transmitted to the shift dial may be transmitted to a driver's hand operating the shift dial.

An elastic protrusion protruding in one direction may be integrally formed on the motor housing, and the motor housing may be in linear contact or point contact with the main housing through the elastic protrusion.

The elastic protrusion may protrude in an opposite direction of the roller, and when the elastic protrusion comes in contact with the main housing, a force that moves the motor housing toward the groove plate may be applied to the motor housing by elasticity of the elastic protrusion, whereby a contact force between the roller and the groove plate may be maintained.

A housing cover may be coupled to a bottom portion of the motor housing, a vibration isolation pad may be coupled to the housing cover, and the motor housing may be connected to the main housing through the vibration isolation pad.

A housing rib may protrude from the main housing, and the vibration isolation pad may be in contact with the housing rib.

The haptic motor may be applied to all of electronic shift control apparatuses of a lever type that enables a user to shift by operating a shift lever, a button type that enables a user to shift by operating a shift button, a column type in which a shift lever is disposed on a steering column, and a toggle type that enables a user to shift by operating a toggle switch.

The electronic shift control apparatus according to various exemplary embodiments of the present invention includes the shift dial which is operated by a driver to select an R-range, an N-range (Nd-range and Nr-range), and a D-range, the P-range button which is operated to select a P-range, and the haptic motor that generates a haptic signal. Accordingly, when a driver shifts into a specific shifting range (R-range) of a vehicle by operating the shift dial, the haptic motor is operated and a haptic signal (tactual signal) is transmitted to the driver, whereby it is possible to prevent mis-operation by the driver when shifting. Therefore, there is an effect that safety may be improved.

Furthermore, since vibration of the haptic motor which is transmitted to the main housing may be minimized by the vibration isolation pad disposed between the main housing and the motor housing, the intensity of the haptic signal which is transmitted to the shift dial may be increased. Accordingly, there is an effect that a driver can more clearly recognize the haptic signal.

The methods and apparatuses of the present invention have other features and advantages which will be apparent from or are set forth in more detail in the accompanying drawings, which are incorporated herein, and the following Detailed Description, which together serve to explain certain principles of the present invention.

BRIEF DESCRIPTION OF THE DRAWINGS

FIG. 7A, FIG. 7B, FIG. 8A and FIG. 8B are views exemplarily illustrating the installation structure of the haptic motor assembly according to various exemplary embodiments of the present invention.

Figure 1:
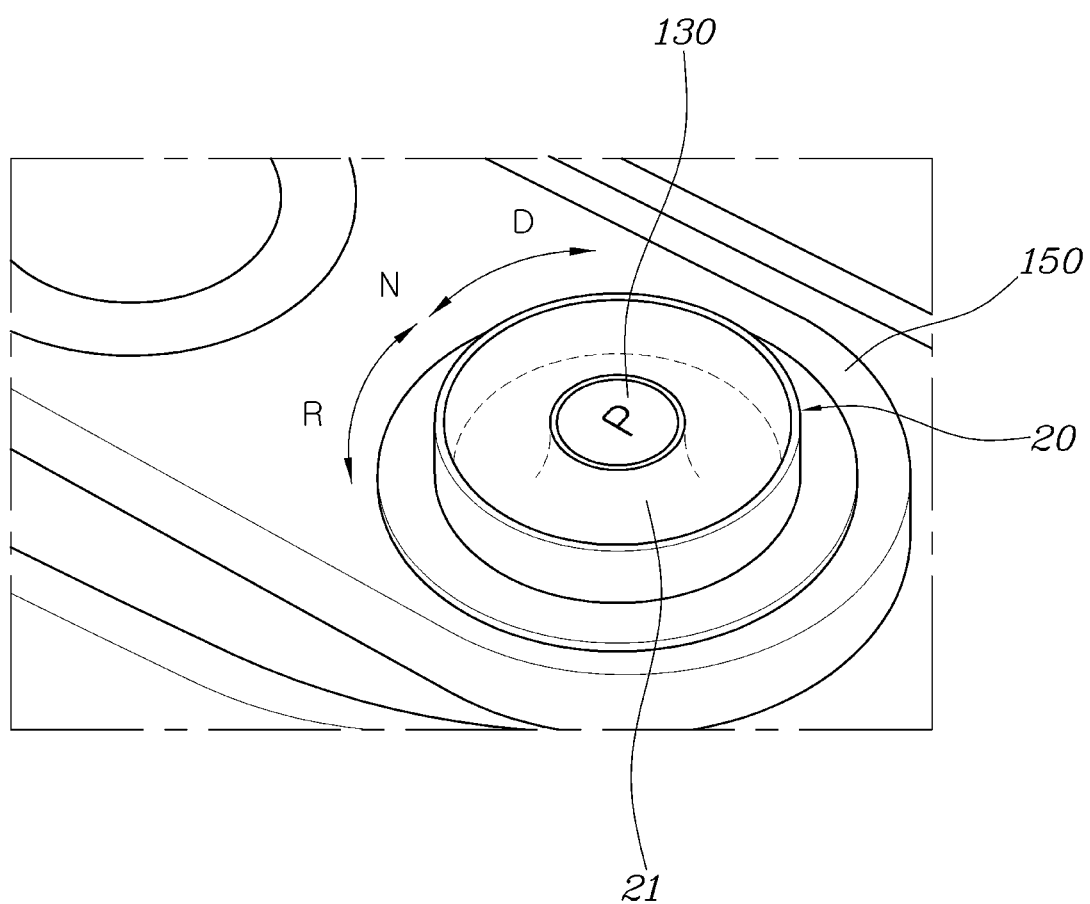
FIG. 1 is a view of an electronic shift control apparatus according to various exemplary embodiments of the present invention.

It may be understood that the appended drawings are not necessarily to scale, presenting a somewhat simplified representation of various features illustrative of the basic principles of the present invention. The specific design features of the present invention as disclosed herein, including, for example, specific dimensions, orientations, locations, and shapes will be determined in part by the particularly intended application and use environment.

In the figures, reference numbers refer to the same or equivalent parts of the present invention throughout the several figures of the drawing.

DETAILED DESCRIPTION

Reference will now be made in detail to various embodiments of the present invention(s), examples of which are illustrated in the accompanying drawings and described below. While the present invention(s) will be described in conjunction with exemplary embodiments of the present invention, it will be understood that the present description is not intended to limit the present invention(s) to those exemplary embodiments. On the other hand, the present invention(s) is/are intended to cover not only the exemplary embodiments of the present invention, but also various alternatives, modifications, equivalents and other embodiments, which may be included within the spirit and scope of the present invention as defined by the appended claims.

In the following description, the structural or functional description specified to exemplary embodiments according to the concept of the present invention is directed to describe the exemplary embodiments of the present invention, so it should be understood that the present invention may be variously embodied, without being limited to the exemplary embodiments.

Embodiments described herein may be changed in various ways and various shapes, so specific embodiments are shown in the drawings and will be described in detail in the exemplary embodiment of the present invention. However, it should be understood that the exemplary embodiments according to the concept of the present invention are not limited to the exemplary embodiments which will be described hereinbelow with reference to the accompanying drawings, but all modifications, equivalents, and substitutions are included in the scope and spirit of the present invention.

It will be understood that, although the terms first, second, etc. may be used herein to describe various elements, these elements should not be limited by these terms. These terms are only used to distinguish one element, from another element. For instance, a first element discussed below could be termed a second element without departing from the right range of the present invention. Similarly, the second element could also be termed the first element.

It is to be understood that when one element is referred to as being "connected to" or "coupled to" another element, it may be directly connected to or directly coupled to another element or be connected to or coupled to another element, having the other element intervening therebetween. On the other hand, it should to be understood that when one element is referred to as being "directly connected to" or "coupled directly to" another element, it may be connected to or coupled to another element without the other element intervening therebetween. Furthermore, the terms used herein to describe a relationship between elements, that is, "between", "directly between", "adjacent" or "directly adjacent" should be interpreted in the same manner as those described above.

Terms used in various exemplary embodiments of the present invention are used only to describe specific exemplary embodiments rather than limiting the present invention. Singular forms are intended to include plural forms unless the context clearly indicates otherwise. It will be further understood that the terms "comprises" or "have" used in the exemplary embodiment specify the presence of stated features, numerals, steps, operations, components, parts, or a combination thereof, but do not preclude the presence or addition of one or more other features, numerals, steps, operations, components, parts, or a combination thereof.

Unless otherwise defined, all terms including technical and scientific terms used herein have the same meaning as commonly understood by those skilled in the art to which various exemplary embodiments of the present invention belongs. It must be understood that the terms defined by the dictionary are identical with the meanings within the context of the related art, and they should not be ideally or excessively formally defined unless the context clearly dictates otherwise.

A control unit (controller) according to exemplary embodiments of the present invention may be implemented through a nonvolatile memory configured to store algorithms for controlling operation of various components of a vehicle or data about software commands for executing the algorithms, and a processor configured to perform operation to be described below using the data stored in the memory. The memory and the processor may be individual chips. Alternatively, the memory and the processor may be integrated in a single chip. The processor may be implemented as one or more processors.

An electronic shift control apparatus according to exemplary embodiments of the present invention is described hereafter in detail with reference to the accompanying drawings.

An electronic shift control apparatus according to various exemplary embodiments of the present invention, as shown in FIG. 1, FIG. 2, FIG. 3, FIG. 4, FIG. 5, FIG. 6, FIG. 7A, FIG. 7B, FIG. 8A and FIG. 8B, includes: a main housing 10 fixed in the interior of a vehicle; a shift dial 20 operated to rotate with respect to the main housing 10 by a driver and selecting any one of shifting ranges of the vehicle when being rotated; a rotator 30 coupled to the shift dial 20 to rotate together; a groove plate 40 coupled to the rotator 30 to rotate together; a Printed Circuit Board (PCB) 50 fixed to the main housing 10 and outputting a shifting range signal selected by the shift dial 20; and a haptic motor assembly 60 fixed to the main housing 10, connected to the groove plate 40, controlled to operate by the PCB 50, and generating a haptic signal when operating.

The main housing 10 may be fixed to the vehicle body such as the console, the center fascia, or the like close to the driver seat in a vehicle, but the installation position may be changed, if necessary.

The shift dial 20 is configured as an assembly of an upper dial 21 and a lower dial 22 that are integrated with each other. The upper dial 21 includes glass that can transmit light and the light emitted from an light-emitting diode (LED) is externally exposed through the upper dial 21 made of glass, whereby the electronic shift control apparatus may be made more elegant.

In the electronic shift control apparatus according to various exemplary embodiments of the present invention, the LED is electrically connected to the PCB 50, so that the LED is controlled to be turned on or off by the PCB 50.

The rotator 30 is integrally coupled to the bottom portion of the shift dial 20 and extends downwardly from the shift dial 20. When the shift dial 20 is operated by a driver, the shift dial 20 and the rotator 30 are rotated together clockwise or counterclockwise with respect to the main housing 10.

The rotator 30 is coupled to the lower dial 22 of the shift dial 20.

The groove plate 40 has a circular annular shape, has an arc-shaped groove circumferentially formed on the external surface, is integrally coupled to the rotator 30, and rotates with the rotator 30.

The PCB 50 is disposed under the groove plate 40, is fixed to the main housing 10, and is electrically connected to the power source (battery) of a vehicle to be able to be supplied with power.

The PCB 50 is configured for outputting a shifting range signal selected when the shift dial 20 is operated to a Transmission Control Unit (TCU) 70 and a function of controlling the operation of a haptic motor 62 to be described below. The frequency, intensity, and number of times of vibration which is generated by the haptic motor 62 may be controlled to be changed by the PCB 50.

According to various exemplary embodiments of the present invention, a haptic signal generated by the haptic motor assembly 60 is transmitted to the shift dial 20 through the groove plate 40 and the rotator 30 and is finally transmitted the driver's hand operating the shift dial 20. Accordingly, the driver receives the haptic signal (tactual signal), whereby the degree of recognition of the driver shifting gears may be maximized.

The shifting range of a vehicle which is selected when the shift dial 20 is operated in accordance with various aspects of the present invention is one of an R-range, an N-range (Nd-range and Nr-range), and a D-range.

The groove plate 40 is coupled to the rotator 30 to rotate together, the groove of the groove plate 40 comes in contact with a detent assembly 80 having a plate spring, and the detent assembly 80 is fixed to the main housing 10.

When the shift dial 20 is rotated, an operation feeling is generated by contact of the groove plate 40 and the detent assembly 80. When the operation force applied by the driver is removed from the rotated shift dial 20, the rotated shift dial 20 is returned to the initial position by elasticity of the detent assembly 80.

That is, when the shift dial 20 is rotted clockwise from a Null-range, the D-range after the Nd-range is selected. When the shift dial 20 is rotated counterclockwise, the R-range after the Nr-range is selected. When the operation force is removed, the shift dial 20 is returned to the Null-range from the D-range or the R-range by elasticity of the groove plate 40 and the detent assembly 80.

The electronic shift control apparatus according to various exemplary embodiments of the present invention further includes a sensing gear 90 rotatably coupled to the main housing 10 and engaged with the rotator 30 in an external gear type, and a magnet 100 combined with the sensing gear 90.

A gear portion 31 having a predetermined length is circumferentially formed on the external surface of the rotator 30. The gear portion 31 of the rotator 30 is engaged with the sensing gear 90 in an external gear type. The magnet 100 is fixed to the sensing gear 90 to face the PCB 50.

When the shift dial 20 due to a position change is rotated by a driver, the rotator 30 and the sensing gear 90 are rotated.

As the sensing gear 90 is rotated, the PCB 50 recognizes a shifting range signal of any one of the R-range, the N-range (Nd-range and Nr-range), and the D-range according to a change of magnetic flux due to a position change of the magnet 10 and outputs the shifting range signal to the TCU 70.

A Shift-By-Wire (SBW) system which is an electronic shift system has no mechanical connection structure such as a cable between the shift dial 20 and the transmission of the vehicle. When the shift dial 20 is operated by a driver and any one shifting range of the R-range, the N-range (Nd-range and Nr-range), and the D-range is selected, the PCB 50 transmits the selected shift signal to the TCU 70, a transmission actuator 110 is operated in a response to a signal provided from the TCU 70, and hydraulic pressure is applied or cut to the hydraulic circuit of each of the shifting ranges of a transmission 120 by operation of the transmission actuator 110, whereby shifting is electronically performed by the transmission 120.

The electronic shift control apparatus according to various exemplary embodiments of the present invention further includes a P-range button 130 which is disposed at the center portion of the shift dial 20 to be movable upwards and downwards and is configured to be pressed by a driver. When the P-range button 130 is operated, the PCB 50 recognizes a contact of the P-range button 130 and generates a P-range signal, and the P-range signal is transmitted to the TCU 70.

When a driver presses down the P-range 120, a switch rubber disposed under the P-range button 130 is elastically compressed and brought in contact with the PCB 50. The PCB 50 recognizes a contact of the P-range button 130 and generates a P-range signal when the P-range button 130 is operated, and the generated P-range signal is transmitted to the TCU 70.

When the driver releases the P-range button 130, the P-range button moved down is moved upwards and returned to the initial position by elastic restoration of the switch rubber.

The haptic motor assembly 60 according to various exemplary embodiments of the present invention may include a motor housing 61 fixed to the main housing 10; a haptic motor 62 inserted and fixed in the motor housing 61, electrically connected to the PCB 50, and controlled to operate by the PCB 50; and a roller 63 rotatably coupled to the motor housing 61 and being in contact with the groove plate 40.

The PCB 50 operates the haptic motor 62 only when a shift signal selected when the shift dial 20 is operated and the actual shift signal of the transmission 120 which is fed back through the TCU 70 coincide with each other.

That is, when a shift signal selected when the shift dial 20 is operated is transmitted to the PCB 50, the PCB 50 transmits the selected shift signal to the TCU 70, the transmission actuator 110 is controlled to operate by the TCU 70 and actual shifting is performed in the transmission 120, the actual shift signal of the transmission 120 is fed back to the PCB 50 through the TCU 70, and the PCB 50 operates the haptic motor 62 only when the shift signal selected when the shift dial 20 is operated and the actual shift signal of the transmission 120 which is fed back through the TCU 70 coincide with each other.

When the shift dial 20 is operated and the R-range is selected, the haptic motor 62 is controlled to operate and generate a haptic signal by the PCB 50. The haptic signal is transmitted to the shift dial 20 through the haptic motor housing 61, the roller 63, the groove plate 40, and the rotator 30 with a minimum loss, and is finally transmitted to the driver's hand operating the shift dial 20. Accordingly, the driver receives a tactual signal due to vibration of the haptic motor 62, whereby the degree of recognition of the driver operating the shift dial may be maximized.

Since the driver receives a haptic signal through the shift dial 20, it is possible to prevent an accident caused by wrong selection of the shifting ranges, whereby it is possible to further improve safety when shifting.

According to various exemplary embodiments of the present invention, an elastic protrusion 64 protruding in one direction is integrally formed on the motor housing 61 and the motor housing 61 is in linear contact or point contact with the main housing 10 through the elastic protrusion 64.

When the motor housing 61 is provided to be in surface-contact with the main housing 10, most of vibration generated by the haptic motor 62 is transmitted to the main housing 10 being in surface-contact with the motor housing 61 and a small amount of vibration is transmitted to the shift dial 20 that a driver holds with a hand. Accordingly, the driver cannot clearly recognize a haptic signal (tactual signal) and the driver may select a wrong shifting range when shifting.

Therefore, according to various exemplary embodiments of the present invention, the motor housing 61 and the main housing 10 are in linear or point contact with each other through the elastic protrusion 64 of the motor housing 61, whereby vibration of the haptic motor 62 which is transmitted to the main housing 10 may be minimized and the intensity of the haptic signal which is transmitted to the shift dial 20 may be increased. Accordingly, a driver can more clearly recognize the haptic signal, whereby it is possible to prevent selection of a wrong shifting range.

Since the elastic protrusion 64 protrudes in the opposite direction of the roller 63 in various exemplary embodiments of the present invention, when the elastic protrusion 64 comes in contact with the main housing 10, a force that moves the motor housing 61 toward the groove plate 40 is applied to the motor housing 61 by the elasticity of the elastic protrusion 64. Accordingly, the contact force between the roller 63 and the groove plate 40 may be securely maintained.

According to various exemplary embodiments of the present invention, since the rotating roller 63 is in contact with the groove plate 40, the rotating roller 63 helps the shift dial 20 smoothly rotates while preventing the shift dial 20 from being stuck when the shift dial 20 is rotated.

According to various exemplary embodiments of the present invention, a housing cover 65 is coupled to the bottom portion of the motor housing 61, a vibration isolation pad 66 is coupled to the housing cover 65, and the motor housing 61 is connected to the main housing 10 through the vibration isolation pad 66.

The vibration isolation pad 66 absorbs the vibration of the haptic motor 62 so that the vibration which is transmitted to the main housing 10 may be minimized. Accordingly, most of the vibration of the haptic motor 62 is transmitted to the shift dial 20, so a driver can more clearly recognize a haptic signal.

To minimize the contact portion of the main housing 10 which is in contact with the motor housing 61 through the vibration isolation pad 66, a housing rib 11 protrudes from the main housing 10 and the vibration isolation pad 66 is provided to be in contact with the housing rib 11.

The haptic motor 62 is electrically connected to the PCB 50 through a wiring 141 and a connector 142, and if necessary, the haptic motor 62 may be provided to be in direct contact with the PCB 50 without the wiring.

Figure 2:
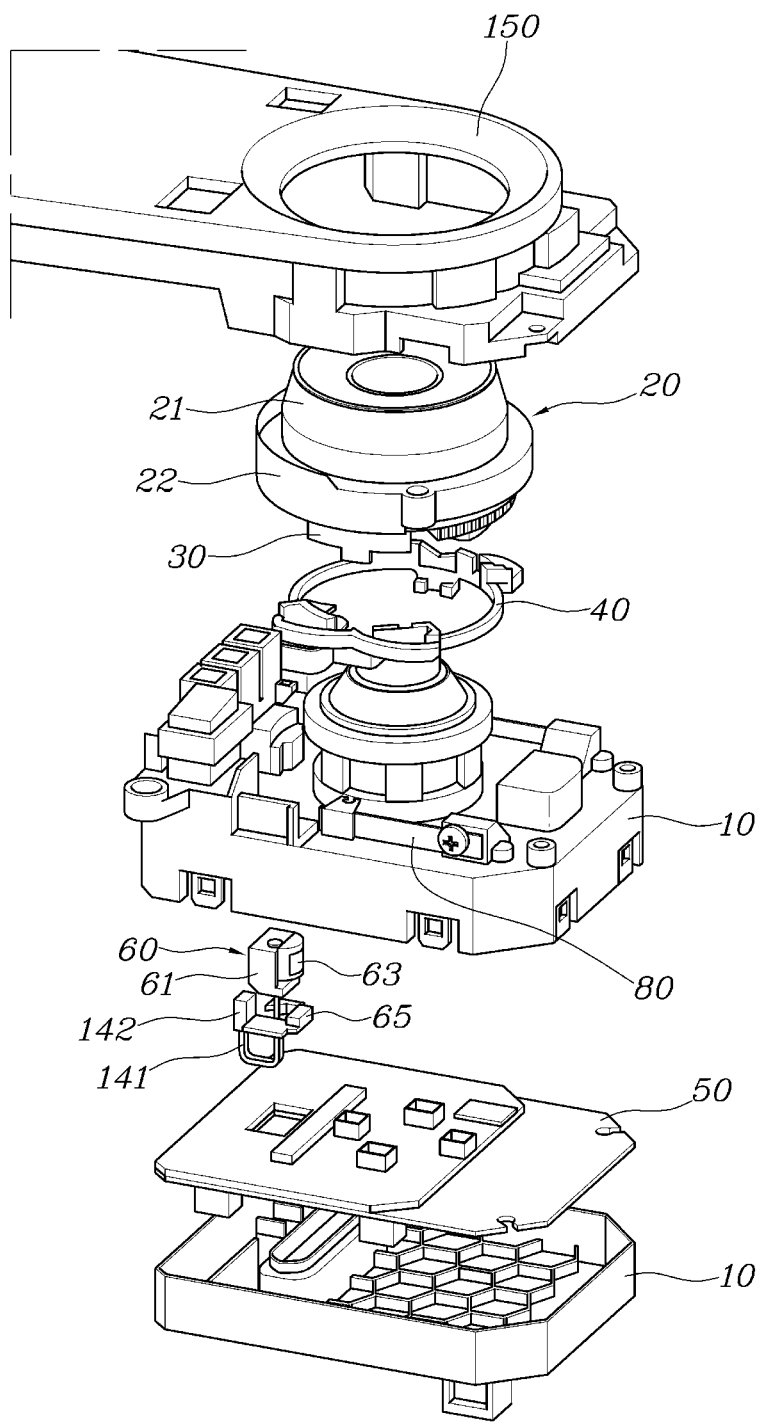
FIG. 2 is an exploded view of FIG. 1.
Figure 3:
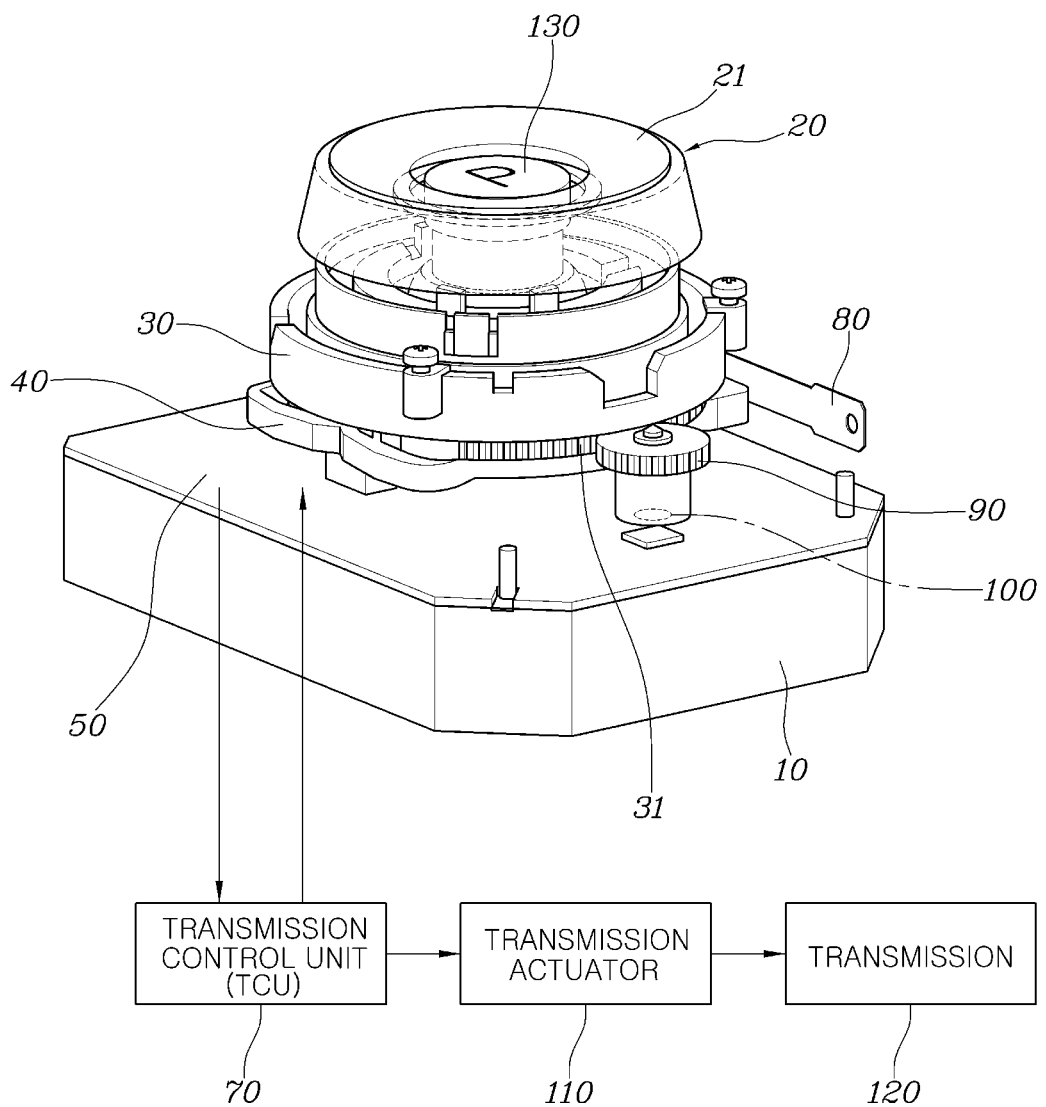
FIG. 3 is a view exemplarily illustrating a sensing gear and a magnet according to various exemplary embodiments of the present invention.
Figure 4:
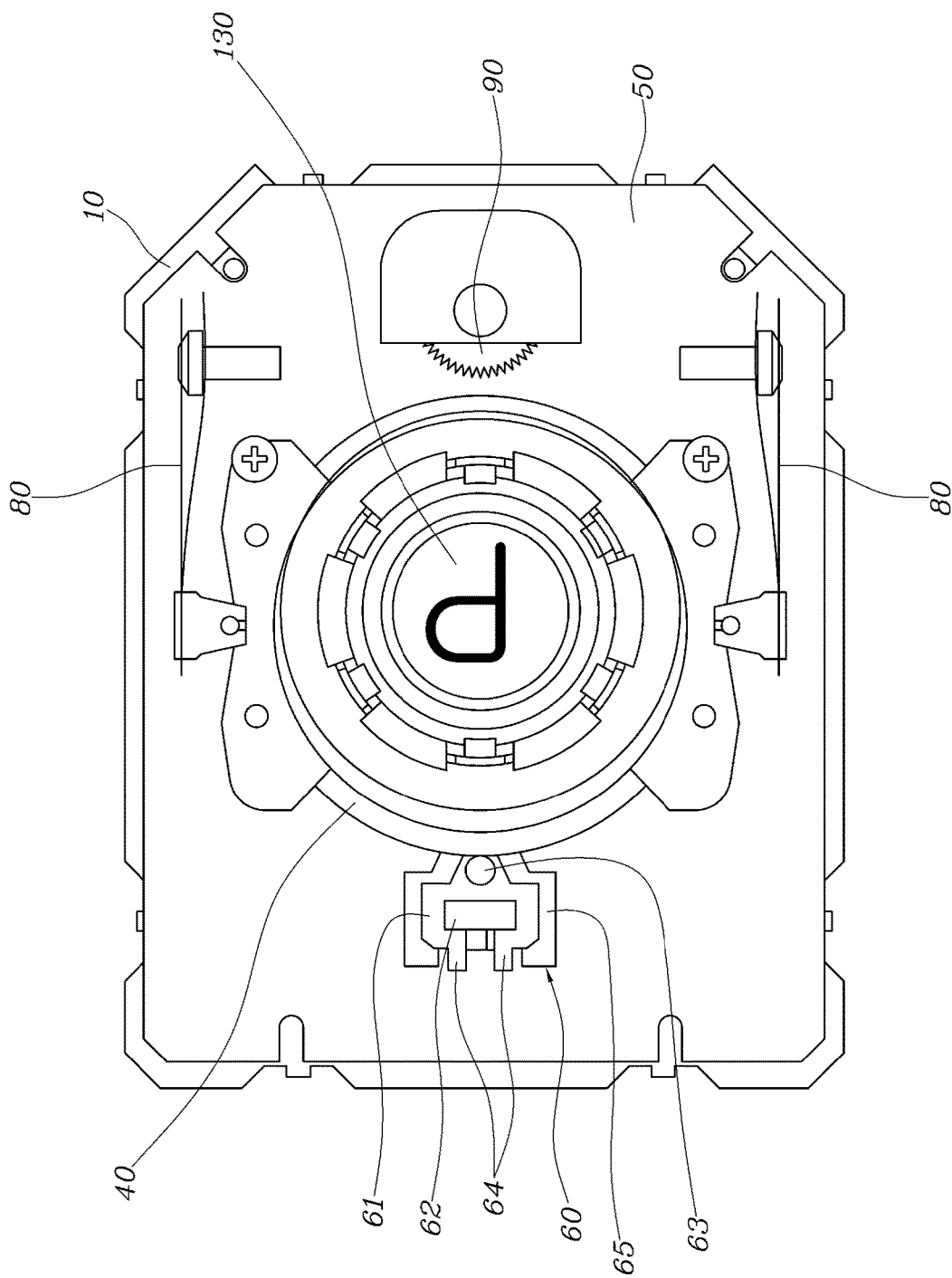
FIG. 4 is a plan view exemplarily illustrating a groove plate and a haptic motor assembly according to various exemplary embodiments of the present invention.
Figure 5:
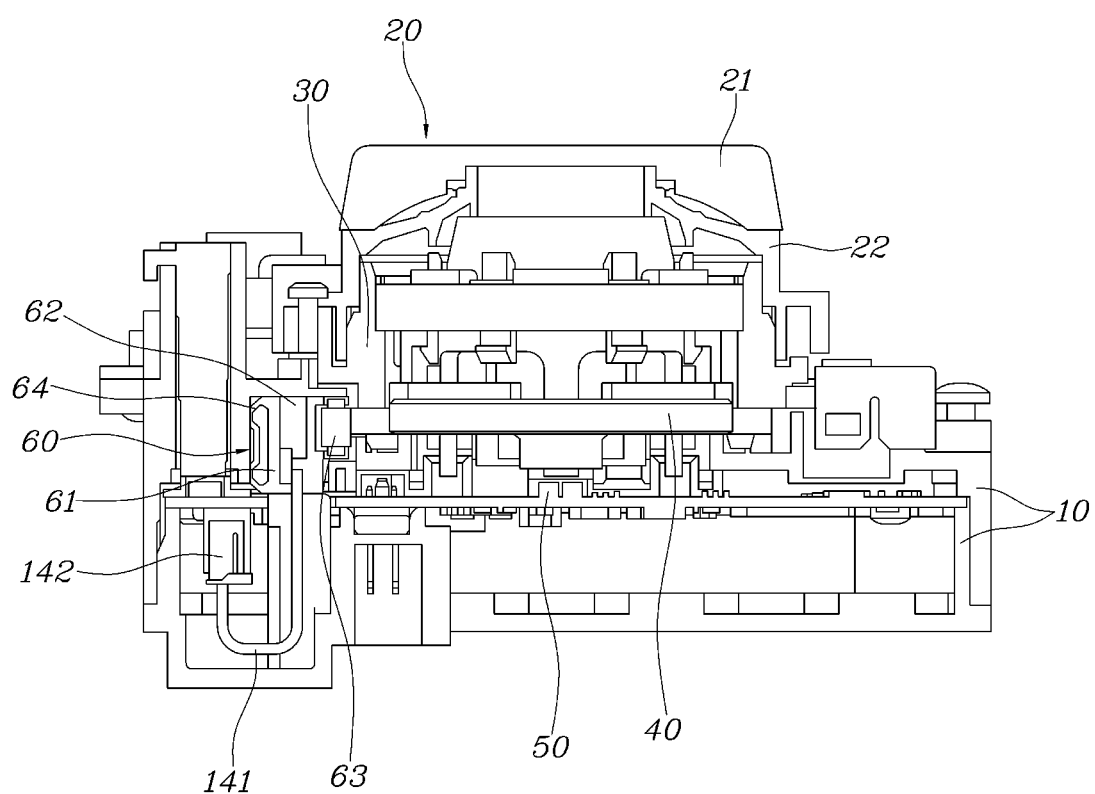
FIG. 5 is a cross-sectional view of an electronic shift control apparatus according to various exemplary embodiments of the present invention.
Figure 6:
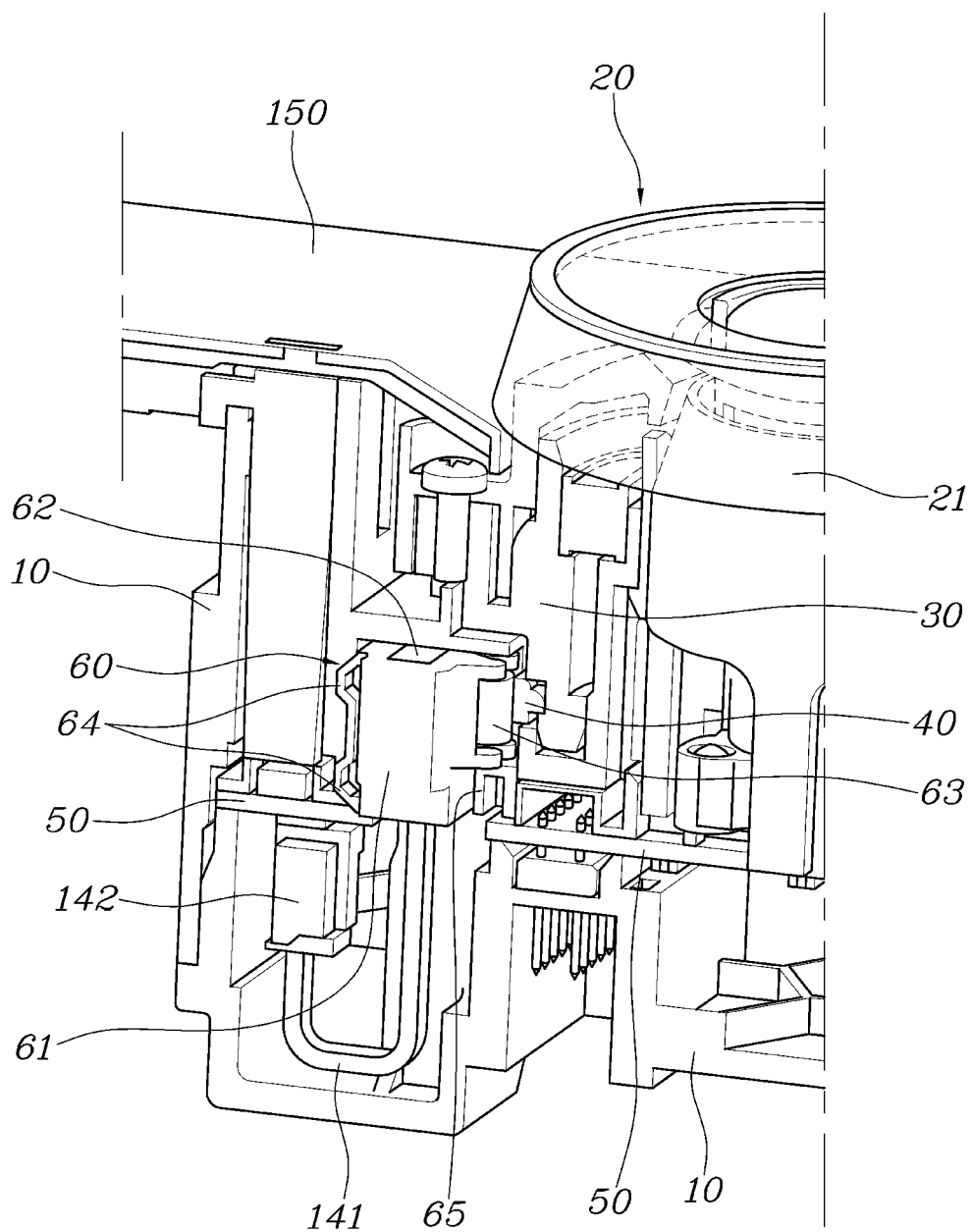
FIG. 6 is an enlarged view showing the portion where the haptic motor assembly shown in FIG. 5 is provided.
Figure 8A:
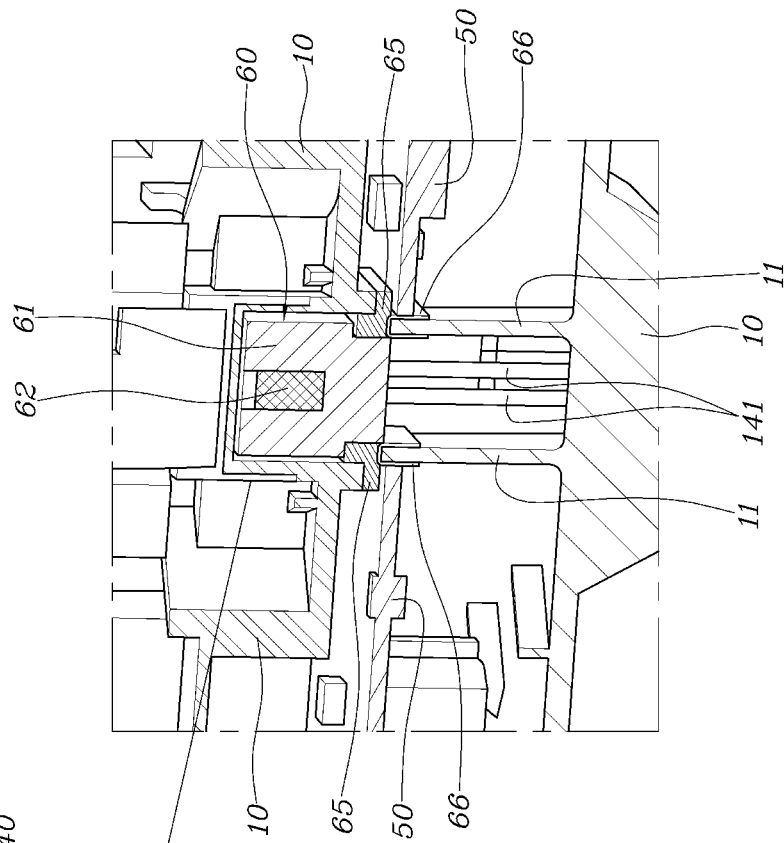
Figure 8B:
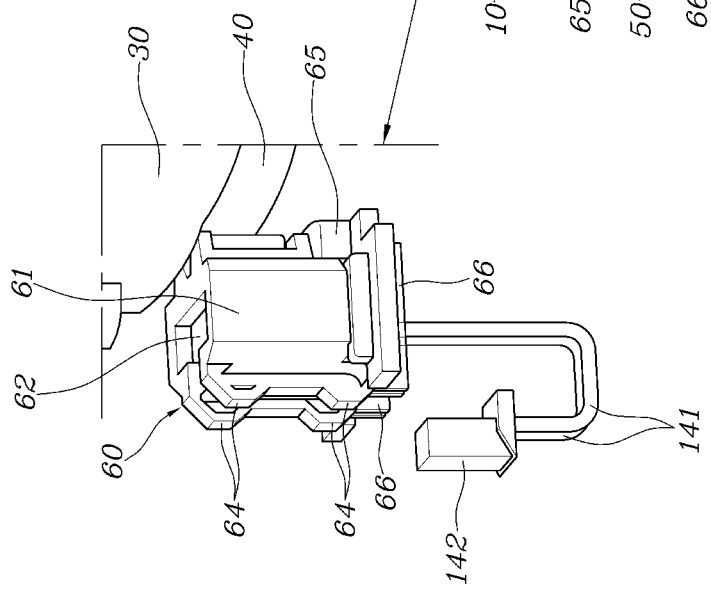

Reference numeral '150' shown in FIG. 1 and FIG. 2 indicates a cover 150. The cover 150 esthetically improves the external appearance by covering most portion of the electronic shift control apparatus including the main housing 10. The shift dial 20 and the P-range button 130 protrude to be exposed over the cover 150. Symbols R, N, D showing the shifting ranges are provided on the cover 150.

The haptic motor 62 according to various exemplary embodiments of the present invention may be applied to and used for all of shift control apparatuses of a lever type that enables a user to shift by operating a shift lever, a button type that enables a user to shift by operating a shift button, a column type in which a shift lever is disposed on a steering column, and a toggle type that enables a user to shift by operating a toggle switch.

As described above, the electronic shift control apparatus according to various exemplary embodiments of the present invention includes the shift dial 20 which is operated by a driver to select an R-range, an N-range (Nd-range and Nr-range), and a D-range, the P-range button 130 which is operated to select a P-range, and the haptic motor 62 that generates a haptic signal. Accordingly, when a driver shifts into a specific shifting range (R-range) of a vehicle by operating the shift dial 20, the haptic motor 62 is operated and a haptic signal (tactual signal) is transmitted to the driver, whereby it is possible to prevent mis-operation by the driver when shifting. Therefore, there is an advantage that safety may be improved.

Furthermore, since vibration of the haptic motor 62 which is transmitted to the main housing 10 may be minimized by the vibration isolation pad 66 disposed between the main housing 10 and the motor housing 61, the intensity of the haptic signal which is transmitted to the shift dial 20 may be increased. Accordingly, there is an advantage that a driver can more clearly recognize the haptic signal.

In an exemplary embodiment of the present invention, the PCB 50 may include a memory and at least a processor configured to execute one or more steps interpreted as an algorithm structure. The memory stores algorithm steps, and the processor executes the algorithm steps to perform one or more processes of a method in accordance with various exemplary embodiments of the present invention. The control device according to exemplary embodiments of the present invention may be implemented through a nonvolatile memory configured to store algorithms for controlling operation of various components of a vehicle or data about software commands for executing the algorithms, and a processor configured to perform operation to be described above using the data stored in the memory. The memory and the processor may be individual chips. Alternatively, the memory and the processor may be integrated in a single chip. The processor may be implemented as one or more processors. The processor may include various logic circuits and operation circuits, may process data according to a program provided from the memory, and may generate a control signal according to the processing result.

The at least one microprocessor may be operated by a predetermined program which may include a series of commands for carrying out the method disclosed in the aforementioned various exemplary embodiments of the present invention.

For convenience in explanation and accurate definition in the appended claims, the terms "upper", "lower", "inner", "outer", "up", "down", "upwards", "downwards", "front", "rear", "back", "inside", "outside", "inwardly", "outwardly", "interior", "exterior", "internal", "external", "forwards", and "backwards" are used to describe features of the exemplary embodiments with reference to the positions of such features as displayed in the figures. It will be further understood that the term "connect" or its derivatives refer both to direct and indirect connection.

The foregoing descriptions of specific exemplary embodiments of the present invention have been presented for purposes of illustration and description. They are not intended to be exhaustive or to limit the present invention to the precise forms disclosed, and obviously many modifications and variations are possible in light of the above teachings. The exemplary embodiments were chosen and described to explain certain principles of the present invention and their practical application, to enable others skilled in the art to make and utilize various exemplary embodiments of the present invention, as well as various alternatives and modifications thereof. It is intended that the scope of the present invention be defined by the Claims appended hereto and their equivalents.

What is claimed is:

1. An electronic shift control apparatus comprising:
   a shift dial rotatable with respect to a main housing for selecting one of shifting ranges of a vehicle when being rotated;
   a rotator coupled to the shift dial to rotate with the shift dial;
   a groove plate coupled to the rotator to rotate with the rotator;
   a Printed Circuit Board (PCB) fixed to the main housing and outputting a shifting range signal selected by the shift dial to a Transmission Control Unit (TCU) electrically connected to the PCB; and
   a haptic motor assembly fixed to the main housing, connected to the groove plate, controlled to operate by the PCB, and generating a haptic signal when operating,
   wherein the haptic motor assembly includes:
      a motor housing fixed to the main housing;
      a haptic motor inserted and fixed in the motor housing, electrically connected to the PCB, and controlled to be operated by the PCB; and
      a roller rotatably coupled to the motor housing and being in contact with the groove plate,
   wherein the motor housing includes an elastic protrusion integrally protruding in one direction from the motor housing,
   wherein the motor housing is in contact with the main housing through the elastic protrusion,
   wherein the elastic protrusion protrudes in an opposite direction of the roller, and
   wherein when the elastic protrusion comes in contact with the main housing, a force that moves the motor housing toward the groove plate is applied to the motor housing by elasticity of the elastic protrusion, whereby a contact force between the roller and the groove plate is maintained.

2. The electronic shift control apparatus of claim 1, wherein the haptic signal generated by the haptic motor assembly is transferred to the groove plate, the rotator, and the shift dial so as to be transmitted to a driver's hand.

3. The electronic shift control apparatus of claim 1,
   wherein the shifting ranges include an R-range, an N-range, and a D-range, and
   wherein the shifting range of the vehicle which is selected when the shift dial is operated is one of the R-range, the N-range, and the D-range.

4. The electronic shift control apparatus of claim 1, further including:
- a sensing gear rotatably coupled to the main housing and engaged with the rotator; and
- a magnet combined with the sensing gear,
- wherein the shifting ranges include an R-range, an N-range, and a D-range, and
- wherein the PCB is configured to output a shifting range signal of one of the R-range, the N-range, and the D-range according to a change of magnetic flux due to a position change of the magnet when the shift dial is rotated.

5. The electronic shift control apparatus of claim 1, further including:
- a P-range button disposed at a center portion of the shift dial to be movable upwards and downwards with respect to the shift dial in response to a driver's pressing thereon,
- wherein the PCB is configured to recognize a contact of the P-range button and to generate a P-range signal when the P-range button is operated.

6. The electronic shift control apparatus of claim 1, wherein the PCB is configured to operate the haptic motor only when a shift signal selected when the shift dial is operated and an actual shift signal of a transmission which is fed back through the TCU coincide with each other.

7. The electronic shift control apparatus of claim 1,
- wherein the shifting ranges includes an R-range, and
- wherein the haptic motor is controlled to generate the haptic signal by the PCB when the shift dial is operated and the R-range is selected.

8. The electronic shift control apparatus of claim 1, wherein a haptic signal generated by the haptic motor is transmitted to the shift dial through the motor housing, the roller, the groove plate, and the rotator, for the haptic signal to be transmitted to a driver's hand operating the shift dial.

9. The electronic shift control apparatus of claim 1,
- wherein the motor housing is in contact with the main housing through the elastic protrusion.

10. The electronic shift control apparatus of claim 1,
- wherein a housing cover is coupled to a bottom portion of the motor housing,
- wherein a vibration isolation pad is coupled to the housing cover, and
- wherein the motor housing is connected to the main housing through the vibration isolation pad.

11. The electronic shift control apparatus of claim 10,
- wherein a housing rib protrudes from the main housing, and
- wherein the vibration isolation pad is in contact with the housing rib.

* * * * *